United States Patent [19]

Ishikawa et al.

[11] Patent Number: 5,669,681
[45] Date of Patent: Sep. 23, 1997

[54] MIRROR SECURING DEVICE

[75] Inventors: Takayasu Ishikawa; Toshihiro Kikuchi; Takashi Kawabe; John R. Whiteford; James R. White, all of Pittsburgh, Pa.

[73] Assignees: Sony Corporation, Tokyo, Japan; Sony Electronics Inc., Park Ridge, N.J.

[21] Appl. No.: 701,516

[22] Filed: Aug. 22, 1996

[51] Int. Cl.[6] ............................................ A47B 81/06
[52] U.S. Cl. ............................ 312/7.2; 312/224; 52/785.1
[58] Field of Search ........................ 52/785.1; 312/224, 312/7.2; 248/466, 475.1

[56] References Cited

U.S. PATENT DOCUMENTS

| | | | |
|---|---|---|---|
| 465,378 | 12/1891 | Lewin | 312/224 |
| 821,167 | 5/1906 | Hart et al. | 312/224 |
| 1,815,940 | 7/1931 | Zoerner | 52/785.1 |
| 3,039,217 | 7/1962 | Stefanakis | 312/224 |
| 3,851,950 | 12/1974 | Awdres et al. | 248/466 |
| 4,479,144 | 10/1984 | Yamazaki et al. | 358/60 |
| 5,475,534 | 12/1995 | Okajima et al. | 359/649 |

*Primary Examiner*—Peter M. Cuomo
*Assistant Examiner*—Gerald A. Anderson
*Attorney, Agent, or Firm*—Pasquale Musacchio; Jerry A. Miller

[57] ABSTRACT

A device for securing a mirror in a projection television is disclosed. The device includes a cabinet having an aperture defined by edges. A shoulder element is located adjacent each of the edges, wherein each shoulder element extends underneath the aperture and is positioned for supporting peripheral edges of a reflection surface of the mirror. The device further includes a mirror cover plate located adjacent a back surface of the mirror and affixed to the cabinet. In addition, the device includes a securing element affixed between the back surface and the mirror cover plate for reducing deformation of said mirror.

21 Claims, 4 Drawing Sheets

MIRROR SECURING DEVICE

FIELD OF THE INVENTION

This invention relates to mirror securing devices for projection televisions, and more particularly, to a mirror securing device which substantially reduces deformation in a center portion of a mirror.

BACKGROUND OF THE INVENTION

Projection televisions typically include a mirror which is utilized for reflecting an image onto a screen. In rear projection type televisions, for example, the mirror is mounted to a rear portion of the television. Referring to FIG. 1, an exploded view of structure used for supporting a first mirror 18 in a conventional rear projection television 10 is shown. The first mirror 18 includes a first reflection surface 19 and a first back surface 21. The television 10 includes a front cabinet 12 and a rear mirror cover 14 which attaches to the front cabinet 12. The mirror cover 14 includes a plurality of mirror blocks 16 upon which the first back surface 21 is positioned. Upper 20 and lower 22 mirror holders are then used to affix upper 24 and lower 26 horizontal portions, respectively, of the first mirror 18 to the mirror blocks 16. In this configuration, however, a center portion 28 of the first mirror 18 is unsupported. This is a disadvantage since the weight of the first mirror 18 causes the center portion 28 to deform, thus resulting in a degradation of picture quality.

Furthermore, it is desirable in projection televisions to improve the mirror reflection ratio of the mirror utilized in order to enhance picture quality. A technique frequently utilized to improve the mirror reflection ratio is to reduce mirror thickness. However, reducing thickness decreases mirror strength, thus increasing mirror deformation and further, the likelihood of damage. Further, such conventional configurations result in cabinet structures which are relatively complicated, thus resulting in increased costs.

SUMMARY OF THE INVENTION

It is an object of the present invention to provide a device for securing a mirror in a projection television such that deformation of the mirror is substantially reduced.

These and other objects, advantages and features of the invention will become apparent to those skilled in the art upon consideration of the following description of the invention.

According to one aspect of the present invention, the device includes a cabinet having an aperture defined by edges. A shoulder element is located adjacent each of the edges, wherein each shoulder element extends underneath the aperture and is positioned for supporting peripheral edges of a reflection surface of the mirror. The device further includes a mirror cover plate positioned adjacent a back surface of the mirror and affixed to the cabinet. In addition, the device includes a securing element affixed between the back surface and the mirror cover plate for reducing deformation of said mirror.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

Figure 1:
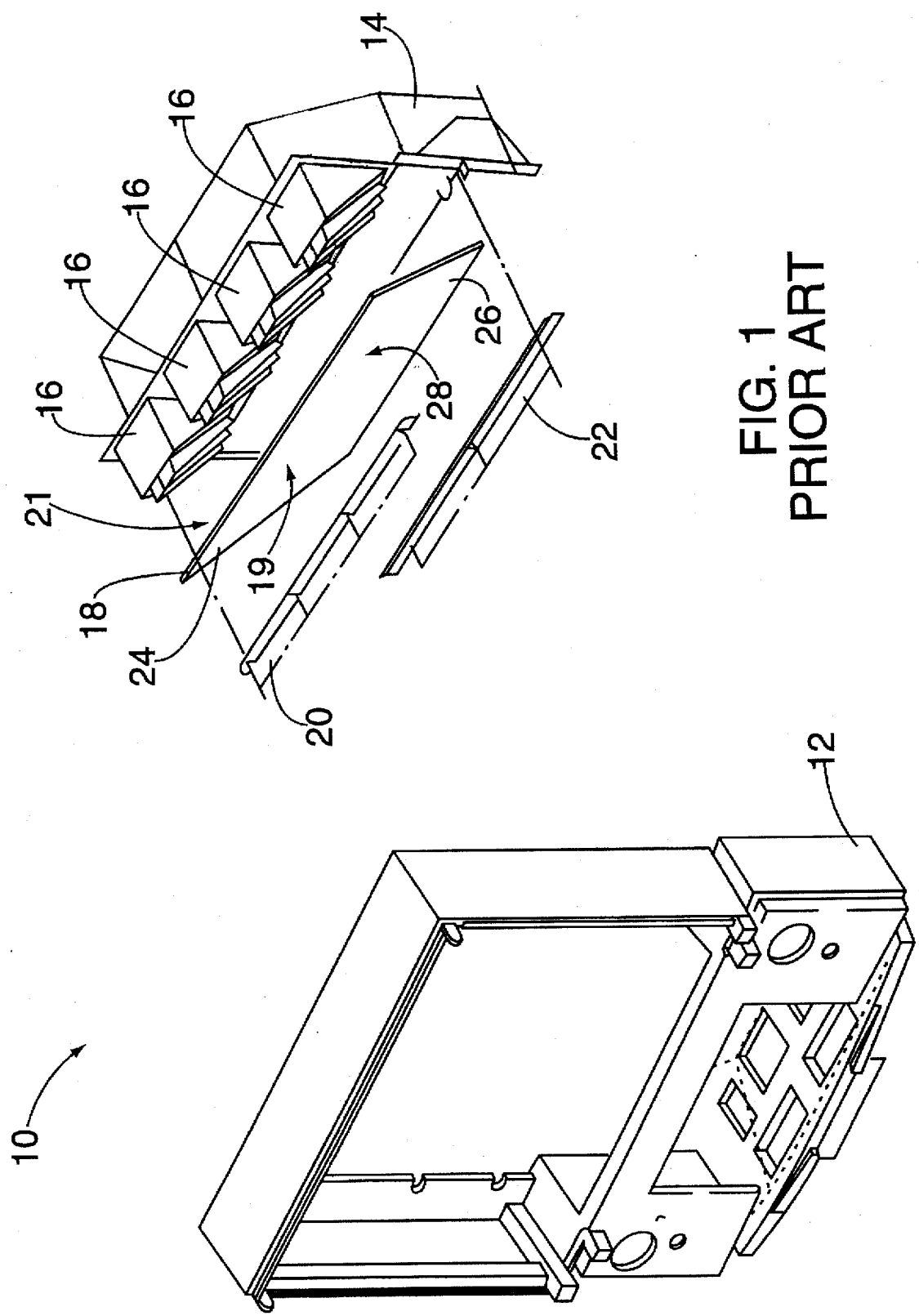
FIG. 1 is an exploded view of a structure used for supporting a mirror in a conventional rear projection television.
Figure 2:
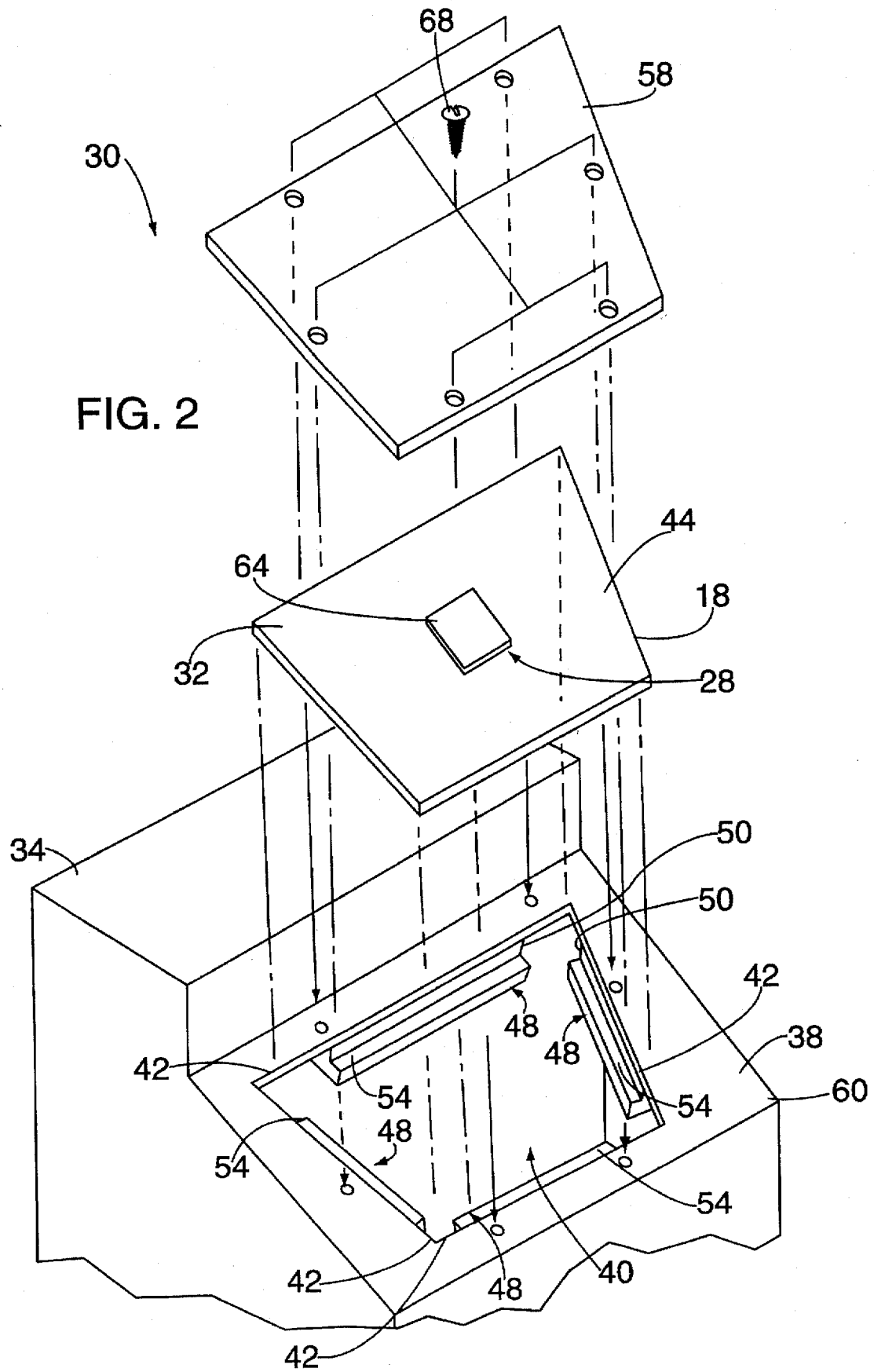
FIG. 2 is an exploded view of the mirror securing device of the present invention.
Figure 3:
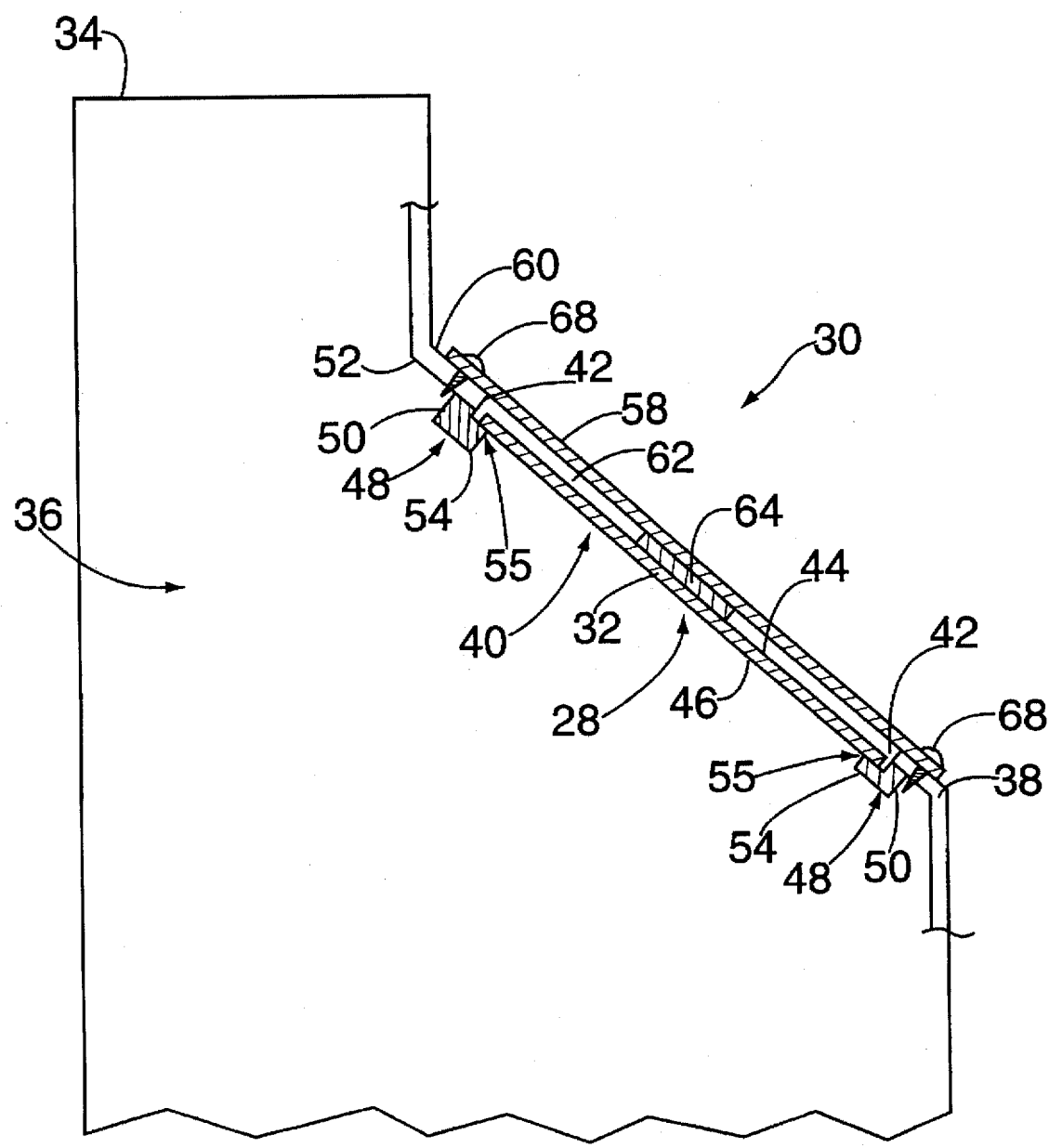
FIG. 3 is a partial cross sectional side view of FIG. 2.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in FIGS. 1–4. FIG. 2 is an exploded view of the mirror securing device of the present invention. FIG. 3 is a partial cross sectional side view of FIG. 2.

Referring to FIG. 2 in conjunction with FIG. 3, a device 30 for securing a second mirror 32 to a projection television cabinet 34 is shown. In accordance with the present invention, the second mirror 32 is thinner than the first mirror 18. The second mirror 32 includes a second back surface 44 and a second reflection surface 46 for reflecting an image onto a screen. The cabinet 34 includes an internal cavity 36 and a sloped wall 38 having an inner 52 and outer 60 surface. An aperture 40 defined by edges 42 is formed in the wall 38. The aperture 40 is configured to receive the second mirror 32. A bracket element 48 is associated with each of the edges 42. Each bracket element 48 includes a first member 50 extending downward from the inner surface 52 and into the cavity 36. Each bracket element 48 farther includes a shoulder member 54 which extends transverse to the first member 50 away from its associated edge and underneath the aperture 40. Each shoulder member 54 is positioned for contacting an associated front peripheral area 55 of the second reflection surface 46.

The device 30 further includes a mirror cover plate 58 positioned on the outer surface 60 and removably secured thereto by fasteners 68. By way of example, the mirror cover plate 58 may be fabricated from wood, plastic or metal. The second back surface 44 is positioned so as to form a gap 62 between the mirror cover plate 58 and the second back surface 44 upon placement of each shoulder member 54 in contact with its associated front peripheral area 55. A resilient securing element 64 is positioned within the gap 62. The securing element 64 is affixed to the mirror cover plate 58 and the second back surface 44 in the center portion 28. By way of example, an adhesive such as glue may be used to affix the securing element 64. Alternatively, the securing element 64 may be fabricated from double sided adhesive tape. In accordance with the present invention, the securing element 64 serves to secure the center portion 28 to substantially reduce deformation of the center portion 28. As a result, thinner mirrors may be used in order to improve picture quality. In addition, the likelihood of mirror damage is substantially decreased. Further, the present invention results in a simplified cabinet structure, thus reducing manufacturing costs. In addition, the securing element 64 may be rectangularly shaped and may be sized either larger or smaller than the center portion 28 as desired. Further, the securing element 64 may be sized proportional to the size of the second mirror 32 and may be located in other areas of the second back surface 44 to secure the second mirror 32 as desired.

Figure 4:
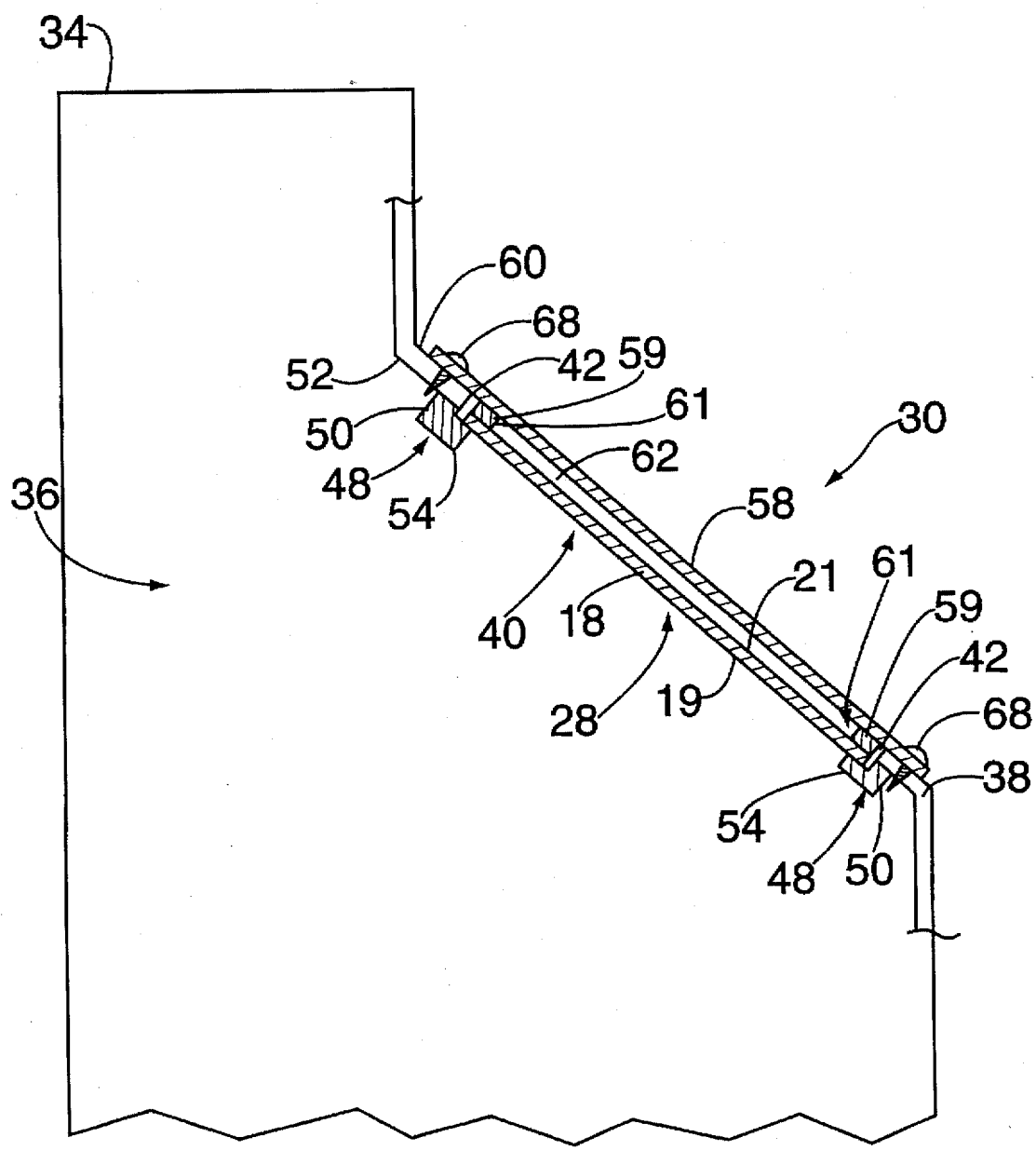
FIG. 4 is a view of an alternate embodiment of the present invention.

Referring to FIG. 4, an alternate embodiment of the present invention is shown. In this embodiment, a further simplified structure is shown for holding a thicker mirror, such as the first mirror 18, without use of the securing element 64. In particular, a resilient spacer element 59, such as a strip of foam, is positioned in contact between rear peripheral areas 61 of the first back surface 21 and the mirror cover plate 58. When the mirror cover plate 58 is secured to the outer surface 60, the foam is compressed and thus biased against the first back surface 21 and the mirror cover plate 58, thereby securing the first mirror 18. As such, a simplified structure is achieved which reduces costs.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations are far within the scope of the appended claims.

What is claimed is:

1. A device for securing a mirror having a reflection surface and a back surface in a projection television, comprising:

a cabinet having an aperture defined by edges;

a shoulder element adjacent each of said edges, each said shoulder element extending underneath said aperture and positioned for supporting peripheral edges of said reflection surface;

a mirror cover plate affixed on said cabinet and adjacent said back surface; and a securing element affixed between said back surface and said mirror cover plate for reducing deformation of said mirror.

2. The device according to claim 1, wherein said securing element is affixed to a center portion of said back surface.

3. The device according to claim 1, wherein said securing element is affixed to said back surface and mirror plate by an adhesive.

4. The device according to claim 1, wherein said securing element includes double sided adhesive tape.

5. The device according to claim 1, wherein said securing element is rectangularly shaped.

6. The device according to claim 1, wherein said securing element is sized proportional to the size of said mirror.

7. The device according to claim 1, wherein said shoulder element extends transverse to a first element, said first element extending from an inner surface of said cabinet.

8. A device for securing a mirror having a reflection surface and a back surface in a projection television, comprising:

a cabinet having an aperture defined by edges;

a mirror cover plate affixed on said cabinet and over said aperture;

a shoulder element located adjacent each of said edges, each said shoulder element extending underneath said aperture and positioned for supporting peripheral edges of said reflection surface to form a gap between said back surface and said mirror cover plate; and a securing element affixed in said gap and between said back surface and said mirror cover plate for inhibiting deformation of said mirror.

9. The device according to claim 8, wherein said securing element is affixed to a center portion of said back surface.

10. The device according to claim 8, wherein said securing element is affixed to said back surface and mirror plate by an adhesive.

11. The device according to claim 8, wherein said securing element includes double sided adhesive tape.

12. The device according to claim 8, wherein said securing element is rectangularly shaped.

13. The device according to claim 8, wherein said securing element is sized proportional to the size of said mirror.

14. The device according to claim 8, wherein said shoulder element extends transverse to a first element, said first element extending from an inner surface of said cabinet.

15. A device for securing a mirror having a reflection surface and a back surface in a projection television, comprising:

a cabinet having an aperture defined by edges;

a bracket element adjacent each of said edges, each said bracket element including a first element and a shoulder element, said first element extending from an inner surface of said cabinet and said shoulder element extending transverse to said first element and underneath said aperture and positioned for supporting peripheral edges of said reflection surface;

a mirror cover plate affixed on said cabinet and adjacent said back surface; and double sided adhesive tape having a rectangular shape affixed between said back surface and said mirror cover plate for inhibiting movement of said mirror and thus reducing deformation of said mirror.

16. The device according to claim 15, wherein said securing element is sized proportional to the size of said mirror.

17. The device according to claim 15, wherein said mirror cover plate is fabricated from wood.

18. The device according to claim 15, wherein said mirror cover plate is fabricated from metal.

19. The device according to claim 15, wherein said mirror cover plate is fabricated from plastic.

20. The device according to claim 15, wherein said tape is affixed to a center portion of said back surface.

21. A device for securing a mirror having a reflection surface and a back surface in a projection television, said back surface having outer peripheral areas, comprising:

a cabinet having an aperture defined by edges;

a bracket element adjacent each of said edges, each said bracket element including a first element and a shoulder element, said first element extending from an inner surface of said cabinet and said shoulder element extending transverse to said first element and underneath said aperture and positioned for supporting peripheral edges of said reflection surface;

a mirror cover plate affixed on said cabinet and adjacent said back surface; and a resilient element positioned between said outer peripheral areas and said mirror cover plate and biased therebetween to secure said mirror.

* * * * *